United States Patent [19]

Bayha et al.

[11] Patent Number: 5,686,514
[45] Date of Patent: Nov. 11, 1997

[54] PRODUCTION AND USE OF FIRE RETARDANT DISPERSIONS AS ADDITIVES FOR BUILDING PANELS

[75] Inventors: Charles E. Bayha, Collierville, Tenn.; Arthur H. Conley, Houston, Tex.

[73] Assignee: Sequentia, Inc., Strongsville, Ohio

[21] Appl. No.: 518,166

[22] Filed: Aug. 24, 1995

[51] Int. Cl.$^6$ .............. C08K 5/49; C09K 21/08; C09K 21/12; C08L 35/00
[52] U.S. Cl. .............. 524/145; 524/404; 524/409; 524/464; 524/469; 252/609; 428/921
[58] Field of Search .............. 428/430, 431, 428/413, 288, 292, 482, 921; 427/340, 372.2, 385.5; 523/516; 252/609; 524/115, 136, 140, 141, 145, 147, 404, 405, 408, 409, 410, 464, 465, 467, 468, 469, 471, 494; 525/445, 447; 528/275, 285

[56] References Cited

U.S. PATENT DOCUMENTS

| | | | |
|---|---|---|---|
| 3,772,455 | 11/1973 | Nicodemus et al. | 174/121 A |
| 3,936,414 | 2/1976 | Wright et al. | 523/517 |
| 4,417,021 | 11/1983 | Nakamura | 524/538 |
| 4,619,954 | 10/1986 | Warner, II | 523/516 |
| 4,764,539 | 8/1988 | Ladang | 106/122 |
| 4,857,576 | 8/1989 | Kochi et al. | 524/409 |
| 5,252,682 | 10/1993 | Bayha | 525/445 |
| 5,318,853 | 6/1994 | Bayha et al. | 428/431 |

OTHER PUBLICATIONS

Designation: E 84 –94 Standard Test Method for Surface Burning Characteristics of Building Materials (Jun. 21, 1995).

*Primary Examiner*—Joseph D. Anthony
*Attorney, Agent, or Firm*—Vickers, Daniels & Young

[57] ABSTRACT

A fire retardant system useful in a thermosetting resin system comprises a dispersion of particles of a halogen-containing organic material and an inorganic synergist in a liquid phosphorus carrier. The particles in the blend are reduced to 20 microns or less by suitable means, for example, by processing through a 3-roll mill. The composition is incorporated into the resin in an amount of between 3% and 15% by weight of resin where the dispersion remains in suspension during curing of the resin. The thermosetting resin is a saturated or an unsaturated resin such as a polyester, a polyepoxide or a polyurethane. The resin when formed into a ceiling panel has a flame-spread index less than 25 and a smoke rating of 450 or less when tested according to ASTM Test E-84.

51 Claims, No Drawings

PRODUCTION AND USE OF FIRE RETARDANT DISPERSIONS AS ADDITIVES FOR BUILDING PANELS

BACKGROUND OF INVENTION

This invention relates to the general field of building panels, more particularly to ceiling panels of the type that are made from a thermosetting resin reinforced with fiberglass. Fiberglass is composed of thin strands of chopped glass that has been previously surface treated. Typically, fire retardant additives are included in the panel for purposes of safety and compliance with federal, state, and local building codes and fire regulations.

Numerous approaches have been used for imparting fire retardant properties to thermosetting resins. One of the most common approaches utilizes the incorporation of halogens into the resin system. Halogen is a term that refers to a group of atoms, e.g. chlorine, bromine, iodine, fluorine. Bromine and chlorine are atoms that have fire retardant properties and conventionally are referred to as halogen fire retardants. These halogen moieties are incorporated into the resin systems in one of two approaches, the additive approach and the reactive approach.

In the reactive approach, halogen containing polyesters are used either as the sole oligomer or in conjunction with conventional polyester oligomers. Oligomers are the term given to the reactive polyester without any reactive diluents, e.g. styrene, methyl methacrylate. These oligomers are normally thinned with reactive monomers to produce finished resin materials. Typical examples would involve the use of compounds such as tetrachloro or tetrabromo phthalic anhydride. Although these types of polyester oligomers are effective fire retardants, physical properties of panels made with said polyesters tend to be of lower quality than conventional non-fire retardant polyesters. Another approach to the reactive fire retardancy method is to incorporate a reactive halogen-containing monomer into the resin system. These reactive monomers tend to be unstable and often react erratically with conventional polyesters. Both approaches are considerably more expensive than conventional polyester resins.

In the additive approach to fire retardant resins, a non-reactive liquid or solid fire retardant material is added to the resin mix to obtain reduced flame spread. Although liquid fire retardant materials can be readily added to the resin mix before polymerization, the halogen content of these liquid fire retardants is restricted by solubility considerations. Furthermore these liquid retardants tend to plasticize and degrade physical properties of the cured resin.

The addition of insoluble non-reacting fire retardant additives to resin systems overcomes the problems associated with the liquid fire retardant systems. Solid additives having a high percent of halogen, either bromine or chlorine, can be used. Furthermore, the additives are easily incorporated into the resin system and have a minimal effect on physical properties. The performance of these additives can be further enhanced by adding an inorganic synergist to the system. However, the density of these solid additives and synergists is considerably greater than that of the resin mix. Thus, constant stirring of the resin mix prior to cure is necessary to prevent the particles from quickly settling in the resin system.

When using a high-speed production system to produce building panels of the present invention, the resin system is fed onto the planar surface of a moving layer of film. Glass fiber strands, surface treated to make them wettable, are fed continuously into glass chopping equipment. The cut fibers are then added gravimetrically in a random manner to the formulated resin mix. After the chopped fibers are wet out, a second layer of carrier film is applied to the mix. The mix is now confined between two layers of carrier film and is carried continuously through a nip roll to control resin thickness. The whole then passes through a series of curing ovens to initiate, shape, and cure the resin mix. After removal of carrier films, the cured panel is continuously cut, trimmed and inspect for defects.

During this process, the particles of the flame retardant and the synergist migrate toward the bottom of the panel where they remain following curing of the system. General details of this production method are described in U.S. Pat. No. 4,619,954 entitled *Fiberglass Reinforced Plastic Sheet Material with Fire Retardant Filler*, the subject matter of which is incorporated herein by reference. Typically, the panels of the present invention are used as ceiling panels and are embossed or otherwise decorated on the top surface thereof. During installation, the embossed surface becomes the bottom surface of the ceiling panel visible from below.

One of the standard flammability tests for determining the flame resistant characteristics of decorative ceiling panels is called the Steiner Tunnel Flame Test, ASTM designation E-84. This test helps to determine the degree of flame-spread of a specimen or sample by applying a flame to the bottom (decorative) side of the panel while mounted in its normal position.

The fire retardant dispersion additives used with the resins in the production of ceiling panels impart the attributes of the panel that are measured by this test. Since during production of the panel, the heavier solid fire retardants tend to settle and become more concentrated at the bottom of the panel, the test results of the Steiner Tunnel Test are often unsatisfactory because the flame test is actually applied to the surface of the panel where the concentration of fire retardant is at a minimum.

BRIEF DESCRIPTION OF THE INVENTION

In one aspect of the present invention, fire retardant dispersion additives are described for application in thermosetting resins. These additives are comprised of solid, halogen containing materials, inorganic synergists, and liquid organic phosphorus carriers. The most desirable weight ratios of said additives are 55 parts halogen containing moiety, 20 parts inorganic synergist, and 25 parts organic phosphorus carrier. The settling rate of the dispersion, when incorporated into a thermosetting resin is sufficiently slower than the curing rate of the resin whereby settling of the dispersion in the resin during curing is minimized. The solid halogen containing material is non-reactive and capable of being ground to small particle size. It also must be insoluble in the thermosetting resin mix. Non-aromatic character is desirable but not essential. The inorganic synergist is a particulate compound selected from the group consisting of colloidal antimony, antimony compound, a boron compound, and mixtures thereof. The antimony compound may be an antimony oxide or antimony salt. The boron compound may be a metal borate, a boron oxide or a boric acid or derivatives thereof. Mixtures of at least two of the synergists selected from the group may also be used for the purposes of the present invention.

In addition to the three key ingredients, the fire retardant dispersion may include one or more of the following:

a suspending agent, a viscosity modifier, and a smoke suppressant and/or char former.

An important feature of the present invention is that the particle size of the fire retardant dispersion is preferably between about 10 and about 20 microns. It has been discovered that by processing the dispersion through a 3-roll mill to obtain a particle size distribution in this size range, the particles remain dispersed in the resin system for an extended period of time thereby permitting the board to be cured without substantial migration of the particles to the bottom of the board. Calcined clay serves as a suitable suspending agent. The smoke suppressant is preferably selected from a group comprising solid phenolics, melamines, cellulosics, and mixtures thereof. The use of these particular smoke suppressants has the further advantage that these compounds form a char during burning, thereby more effectively precluding the rapid spread of the flame. For cosmetic purposes, a suitable opacifying pigment may be added to the dispersion. The flow properties of the liquid dispersion may be altered by use of a suitable viscosity modifier. The viscosity modifier preferably is selected from the group consisting of an organic amine salt and an ethoxylated aliphatic phosphate.

The present invention includes a method of preparing a dispersion of a composition for enhancing the fire retardancy of thermosetting resins. The method comprises blending together a solid halogen-containing organic material, a solid inorganic synergist, and a liquid organic phosphorus carrier to form a homogeneous dispersion. The homogeneous blend is then passed through a 3-roll mill or other suitable device to produce a dispersion of the solids in a size range whereby settling of the dispersion in a resin system is sufficiently low to permit the resin system to be cured without substantial settling of the particles. The method includes the production of a dispersion wherein the solid components have a particle size of between about 10 and 20 microns. As previously mentioned, a suspending agent, viscosity modifier, and smoke suppressants can be added to the blend. If these components are added to the blend as a solid, they are likewise processed to a particle size of 10 to 20 microns along with the halogen compound and the inorganic synergist.

The invention also includes a fire retardant ceiling panel having an effective amount of a solid fire retardant substance uniformly distributed throughout the cross section of the ceiling panel, said substance prepared according to the process described above. The ceiling panel comprises a thermosetting resin selected from the group consisting of polyesters, epoxy resins, and urethane resins. When subjected to ASTM Test # E-84, the Steiner Tunnel Flame Test, the panel has a flame-spread index (FSI) rating of less than 25 and a smoke rating of less than 450.

The ceiling panel is produced by preparing a blend of a liquid thermosetting resin and fillers, maintaining the blend at a temperature where the blend has a flowable viscosity between about 150 cps and about 250 cps, catalyzing the resin, flowing the catalyzed resin onto a generally flat, moving carrier film, embedding reinforcing fibers into the resin layer, applying a second film layer onto the resin, and curing the resin. The improvement in the process includes adding an effective amount of a fire retardant to the blend before catalyzing, said fire retardant comprising a dispersion including a halogen-containing organic molecule and an inorganic synergist in a liquid organic phosphate carrier, said dispersion having a particle size distribution between about 10 and 20 microns. The dispersion is preferably passed through a 3-roll mill to produce the proper particle size. The fire retardant dispersion is preferably incorporated into the resin blend in an amount of between about 3 and about 15% by weight preferably between about 5% and about 10% by weight of said resin. The resin is polymerized by heating the resin, preferably in a curing oven. After curing, the carrier film and the top film are removed from the cured resin and the panel is cut and trimmed to appropriate size.

It is an object of the present invention to produce a building panel with enhanced fire-resistent characteristics.

Another object of the present invention is a ceiling panel which, when subjected to the ASTM Steiner Tunnel Flame Test, E-84, has a flame spread rating of less than 25 and a smoke rating of less than 450.

It is yet another object of the present invention to process a fire retardant dispersion to produce particles having a size range between 10 and 20 microns whereby settling of the dispersion particles in an uncured thermosetting resin blend is significantly reduced.

Another objective is a ceiling panel with significantly improved fire safety characteristics.

Yet another object is an economically attractive fire retardant dispersion which results in low flame-spread and smoke generation at reduced levels of halogen when added to theremosetting resins, particularly unsaturated polyester, epoxy and urethane resins.

These and other objects are accomplished in a manner to be hereinafter described according to the following detailed description of the present invention.

DETAILED DESCRIPTION

The present invention contemplates the continuous production of a thermosetting resin laminate suitable for use in the production of ceiling tiles, said laminate including a fire retardant uniformly dispersed therein. The continuous production includes the basic steps of providing a bottom sheet or carrier sheet and feeding a layer of thermosetting resin monomer blended with various pigments, promoters, fillers, catalysts, and other additives including the fire retardant additive of the present invention onto a moving sheet to a uniform thickness. The thickness of the resin layer is controlled by a doctor blade. Chopped glass fiber is added gravimetrically onto the moving resin layer. After glass wet out, a second carrier sheet is applied continuously to the moving wet laminate. Air release is achieved by vacuum degassing of the resin prior to catalysis and release of air with defoaming agents in the resin during the glass wet out phase. After the resin mix has passed through a doctor blade, laminate-polymer initiation, shaping, and final cure is accomplished in a series of ovens. The carrier films are then removed and the moving cured sheet is cut and trimmed to the desired length. The described method permits economic efficiency which cannot be met using more expensive techniques such as molding individual panels into shape.

The improved building panel of the present invention is made from a thermosetting resin containing a finely divided dispersion of a fire retardant system. A number of thermosetting resins are used in the building industry in the production of wallboards and ceiling panels. Among these are epoxy resins, polyesters, and polyurethanes.

Epoxy resins are based on the reactivity of an epoxide group

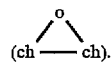

Typically, epoxy resins are made by reacting compounds such as a five mole excess of epichlorohydrin having one or more epoxide groups with a compound such as bisphenol A.

There are numerous other reactions between epoxides and other compounds which can be used to make thermosetting resins. For example, polyolefins may be oxidized by a strong oxidizer such as peracetic acid. The epoxies typically form a tight cross link polymer network and are characterized by good chemical corrosion resistance and toughness and good dielectric properties. Epoxy resins typically utilize between about 3% to 5% by weight of the fire retardant dispersion of this invention.

Polyester resins are formed as the polycondensation product of dicarboxylic acids with dihydroxy alcohol. The dicarboxylic acids are either saturated or unsaturated. Examples are maleic acid, fumaric acid, phthalic acid, and adipic acid. The alcohols are typically glycols of ethylene or propylene. Curing of the polyester is usually accomplished with the use of co-reacting monomers such as styrene and methyl methacrylate. Catalysis is accomplished with a heat-activated peroxide catalyst, e.g. cumene hydroperoxide and benzoperoxide. Polyesters have good resistance to corrosives, chemicals, solvents, etc. They typically require between about 3–6% of the dispersion of this invention.

Polyurethanes are produced by the condensation reaction between a polyisocyanate and a hydroxyl containing material. The reaction takes place in the presence of an organo-tin compound or basic catalyst. Rigid foams of polyurethane may be made from polyethers. Such foams are combustible unless protected by a suitable fire retardant agent. Urethane compositions typically require about 3–10% by weight of the fire retardant dispersion of this invention.

As previously mentioned, the panels are made according to conventional production methods. In the present invention, the efficacy of the fire retardant comprising a halogen-containing organic molecule, a synergist, and a liquid carrier, is based upon the processing of the fire retardant system to achieve an optimum particle size of the solid components of the fire retardant which precludes settling or a separating out of the particles from the resin system prior to the curing of the resin.

The fire retardant dispersion of the present invention contains three primary components, a) a halogen containing solid additive, b) an inorganic synergist, and c) a liquid phosphorus carrier. In addition to these essential components, the composition may include a suspending agent, a viscosity reducing additive, a smoke suppressant, and a pigment.

In greater detail, a halogen-containing additive, having at least about 50% by weight of halogen selected from the group comprising bromine, chlorine, and mixtures thereof, is incorporated into the fire retardant mix in an amount of between about 25 and 75 weight percent, preferably between about 40 and 60 weight percent. The preferred amount is about 55% by weight of the composition. The additive is characterized by being insoluble and nonswelling in the resin system. Furthermore, the additive is inert in the resin. Preferably the additive is an organic which when added to a polymerizable resin will reduce smoke rating in a fire test. The organic backbone of the additive is preferably nonaromatic in nature. The additive is capable of being ground or milled to a small particle size within the range of 10–20 microns. The additive is capable of releasing halogen upon combustion. The halogen is released to coincide with the activity of the inorganic synergistic material for maximum fire retardancy. Low toxicity and price competitiveness with other fire retardant additives are also essential. One example of an aromatic additive that is useful in the teachings of the present invention is decabromo diphenyl oxide.

The inorganic synergist is preferably used in the fire retardant composition in an amount between about 10 and about 30 weight percent, preferably about 20 weight percent. Synergists useful in the present invention are inorganic compounds that are inert and insoluble in the thermosetting resin system and are capable of being milled to a particle size within the range of 10–20 microns. Low toxicity during combustion is important along with price competitiveness. Examples of synergists useful in the present invention are compounds of antimony and boron. Colloidal antimony metal, antimony trioxide and pentoxide, salts of antimony, zinc borate, barium borate, and boric acid are several of the synergists that can be used alone or in combination with one another for the purposes of the present invention.

The liquid phosphorus carrier for the first two components serves the dual function of dispersing the fire retardant additive and low viscosity and providing fire retardant synergism via the organo-phosphorus content. The carrier is present in the fire retardant composition in an amount of between about 20 and about 35 weight percent, preferably about 25 weight percent. A preferred carrier for the purposes of the present invention is butylated triphenyl phosphate. Alternatively, other phosphates well known for their use as carriers in fire retardant compositions may be used.

Suspending agents are used to maintain the halogen-containing compound and the synergist in suspension in the carrier. By increasing the suspension time of the fire retardant additives in the carrier, the uniformity of the suspension throughout the resin mix during curing is optimized. Any suspension agent that does not adversely affect the viscosity or thixotropic properties of the mix may be used. An example is a surface treated calcined clay used in an amount of about 1 pph by weight of the fire retardant composition.

One or more viscosity reducing agents may be used to the fire retardant composition to control the viscosity of the resin mix, especially when water-releasing fillers such as hydrated alumina are used in the resin mix. Furthermore, such additives are useful to offset any thixotropic tendencies caused by the suspending agents. An example of suitable viscosity reducing agents useful in the present invention are organic amine quaternary salts and ethoxylated aliphatic phosphates.

A smoke suppressant and/or char former may optionally be added to the fire retardant composition. Such an ingredient has the ability to act as a latent cross linking agent in a combustion environment, thus counteracting the chain degradation of the resin polymer. Compositions suitable for this purpose include phenolics, melamines, and cellulosics that are solid at ambient temperatures, are insoluble in the resin mix, and are capable of being ground.

A small amount, preferably about 1%, of a white pigment such as titanium dioxide may be added to the fire retardant composition for cosmetic appearances. Any pigment may be used provided the pigment does not have properties which will detract from the ability of the fire retardant composition to achieve its intended objective and that will not otherwise degrade the properties of the resin system per se.

The components of the fire retardant composition preferably are blended together in a suitable mixer such as a Hoffmeyer mixer with a Cowles dissolver. The mix is then further dispersed in a 3-roll mill to obtain the final blend having particles within the range of 10–20 microns.

As previously stated, the fire retardant dispersion is added to the thermosetting resin in an amount of between 3 and 10% by weight of the resin system. Typically, epoxy and vinyl polyesters require about 3 to 5%. Polyurethane compositions vary from 3 to 10% depending upon the rigidity or flexibility of the urethane system. Flexible thermosets require higher levels of the fire retardant than the rigid systems.

The following examples are presented for the purpose of clarifying the teachings of the present invention and providing a mode of implementation.

EXAMPLE 1

A dispersion of a fire retardant was prepared from the following ingredients:

| Ingredient | Functionality | Parts by Weight |
|---|---|---|
| Decabromo diphenyl-oxide | Organic halogen | 55 |
| Antimony trioxide | Synergist | 20 |
| Butylated triphenyl phosphate | Liquid carrier | 25 |
| | | 100% |

In addition, the composition contains chlorwax as a dispersing agent. The ingredients are blended together in a homogenizer. The blend is then processed through a 3-roll mill to reduce the particle size of the solid particles to the range of between about 15–20 microns.

An effective amount of five parts by weight of the dispersion is added to 100 parts of an unsaturated orthophthalate ester and fillers using a high shear mixer to homogenized the blend. The blend is maintained at a viscosity of 150–250 cps using a viscosity reducing agent. The resin blend is catalyzed with a catalyst, and is maintained at a temperature of 110°–115° F. while being formed into a panel using the production method described in U.S. Pat. No. 4,619,954. The cured resin panel is cut and trimmed and a test panel is mounted upside down in a Steiner tunnel test apparatus where it is tested for surface burning behavior according to the protocol described in ASTM Test No. E-84. The test results a flame-spread index less than 25 and smoke rating of 450 or less.

EXAMPLE 2

A dispersion prepared according to Example 1 was prepared with the substitute of barium bromate for the antimony oxide used as a fire retardant dispersion in a vinyl ester resin. The use of barium bromate rather than antimony oxide is preferred in building panels and structure which may come into contact with food and drinkable water.

As in the previous example, a ceiling tile was prepared from a cured panel of the fire retardant polyester. When subjected to ASTM Test No. E-84, the test panel likewise had an FSI of less than 25 and a smoke rating of 450 or less.

Other modifications and variations of the present invention can be made without departing from the present invention, the limits of which are defined by the following claims.

Having thus described the invention, what is claimed is:

1. A resinous fire retardant panel having a fire retardant composition substantially uniform distributed therethrough, said fire retardant panel made by incorporating a fire retardant amount of a fire retardant composition with an uncured resin system, said fire retardant composition comprising a dispersion prepared by
   (a) blending together the following ingredients:
      (i) about 25 to about 75 percent by weight of a solid halogen-containing material comprising an organic molecule wherein the halogen is present within the molecular structure in an amount of at least of about 50% by weight;
      (ii) about 10 to 30 percent by weight of a solid inorganic synergist; and,
      (iii) about 20 to 35 percent by weight of a liquid organic phosphorus carrier, to form a homogeneous blend; and
   (b) processing the homogeneous blend to produce a dispersion of solids having particle sizes of less than or equal to about 20 microns and a settling rate sufficiently low to permit the dispersion, when incorporated into an uncured resin system, to remain in suspension within the system during curing of the resin, said homogeneous blend being substantially inert in said resin system.

2. A fire retardant panel as defined in claim 1, wherein said halogen-containing material includes an aliphatic molecule.

3. A fire retardant panel as defined in claim 1, wherein said halogen-containing material includes decabromo diphenyl oxide.

4. A fire retardant panel as defined in claim 1, wherein said organic phosphorus carrier includes an ethoxylated aliphatic phosphate.

5. A fire retardant panel as defined in claim 1, wherein said resin system is selected from the group consisting of polyesters, polyepoxy resins, and polyurethane resins.

6. A fire retardant panel as defined in claim 1, including reinforcing fibers embedded in said resin system.

7. A fire retardant panel as defined in claim 1, wherein said homogeneous blend is incorporated into said resin system in an amount of about 3 to about 10 percent by weight of said resin system.

8. A fire retardant panel as defined in claim 1, wherein said inorganic synergist is selected from the group consisting of antimony metal, antimony compounds, boron compounds and mixtures thereof.

9. A fire retardant panel as defined in claim 8, wherein said inorganic synergist includes antimony trioxide.

10. A fire retardant panel as defined in claim 1, wherein said homogeneous blend includes an additive selected from the group consisting of a suspending agent, a viscosity modifier, a smoke suppressant and mixtures thereof.

11. A fire retardant panel as defined in claim 10, wherein said homogeneous blend includes a suspending agent comprising a calcined clay.

12. A fire retardant panel as defined in claim 10, wherein said homogeneous blend includes a viscosity modifier comprising an organic amine salt.

13. A fire retardant panel as defined in claim 10, wherein said homogeneous blend includes a solid smoke suppressant selected from the group consisting of phenolics, melamines, cellulosics and mixtures thereof.

14. A fire retardant panel as defined in claim 1, wherein said homogeneous blend comprises by weight:
   Halogen-containing material about 40–about 60%
   Inorganic Synergist about 10–about 30%
   Organic Phosphorus Carrier about 20–about 35%.

15. A fire retardant panel as defined in claim 14, wherein said inorganic synergist is selected from the group consisting of antimony metal, antimony compounds, boron compounds and mixtures thereof.

16. A fire retardant panel as defied in claim 14, wherein said organic phosphorus carrier includes an ethoxylated aliphatic phosphate.

17. A fire retardant panel as defined in claim 14, wherein said homogeneous blend includes an additive selected from the group consisting of a suspending agent, a viscosity modifier, a smoke suppressant and mixtures thereof.

18. A fire retardant panel as defined in claim 14, wherein said halogen-containing material includes an aliphatic molecule.

19. A fire retardant panel as defined in claim 18, wherein said organic phosphorus carrier includes an ethoxylated aliphatic phosphate.

20. A fire retardant panel as defined in claim 19, wherein said homogeneous blend includes an additive selected from the group consisting of a suspending agent, a viscosity modifier, a smoke suppressant and mixtures thereof.

21. A fire retardant panel as defined in claim 20, wherein said homogeneous blend includes a suspending agent comprising a calcined clay.

22. A fire retardant panel as defined in claim 20, wherein said homogeneous blend includes a viscosity modifier comprising an organic amine salt.

23. A fire retardant panel as defined in claim 20, wherein said homogeneous blend includes a solid smoke suppressant selected from the group consisting of phenolics, melamines, cellulosics and mixtures thereof.

24. A fire retardant panel as defined in claim 20, wherein said resin system is selected from the group consisting of polyesters, polyepoxy resins, and polyurethane resins.

25. A fire retardant panel as defined in claim 24, including reinforcing fibers embedded in said resin system.

26. A fire retardant panel as defined in claim 25, wherein said homogeneous blend is incorporated into said resin system in an mount of about 3 to about 10 percent by weight of said resin system.

27. A fire retardant panel as defined in claim 26, having a flame spread valve of less than about 25 and a smoke rating of less than about 450 when subjected to ASTM Test No. E-84.

28. A fire retardant panel prepared from a thermosetting resin selected from the group consisting of polyesters, polyepoxy resins, and polyurethane resins and containing reinforceable fibers embedded therein, the fire retardant properties of said panel being improved by the distribution in said panel of about 3 to about 10 percent by weight of said resin of a substantially inert fire retardant blend comprising at least about 25 percent by weight of a solid organic halogen-containing material, about 10 to about 30 percent by weight of a solid inorganic synergist, and about 20 to about 35 percent by weight of a liquid organic phosphoric carrier, said solid halogen-containing material includes an aliphatic compound wherein at least the majority of the weight of the aliphatic compound is a halogen selected from the group consisting of bromine, chlorine and mixtures thereof, said inorganic synergist is selected from the group consisting of antimony metal, antimony compounds, boron compounds and mixtures thereof, said fire retardant blend consisting essentially of solid particles having a particle size up to 20 microns.

29. A fire retardant panel as defined in claim 28, wherein said homogeneous blend comprises by weight:

Halogen-containing material about 40–about 60%

Inorganic Synergist about 10–about 30%

Organic Phosphorus Carrier about 20–about 35% .

30. A fire retardant panel as defined in claim 28, wherein said halogen-contained material further includes decabromo diphenyl oxide.

31. A fire retardant panel as defined in claim 28, wherein said inorganic synergist includes antimony trioxide.

32. A fire retardant panel as defined in claim 28, wherein said organic phosphorus carrier includes an ethoxylated aliphatic phosphate.

33. A fire retardant panel as defined in claim 28, wherein said homogeneous blend includes an additive selected from the group consisting of a suspending agent, a viscosity modifier, a smoke suppressant and mixtures thereof.

34. A fire retardant panel as defined in claim 33, wherein said homogeneous blend includes a suspending agent comprising a calcined clay.

35. A fire retardant panel as defined in claim 33, wherein said homogeneous blend includes a viscosity modifier comprising an organic amine salt.

36. A fire retardant panel as defined in claim 33, wherein said homogeneous blend includes a solid smoke suppressant selected from the group consisting of phenolics, melamines, cellulosics and mixtures thereof.

37. The process of preparing a fire retardant panel comprising the steps of preparing a blend of a thermosetting resin and fillers, maintaining the blend at a temperature at which the blend has a flowable viscosity, catalyzing the resin, flowing the resin onto a moving carrier film, embedding reinforcing fibers into the resin layer, applying a second film layer on top of the resin, and curing the resin, the improvement comprising adding about 3 to about 10 weight percent of a substantially inert fire retardant to the blend before catalyzing the blend, said fire retardant comprising a dispersion including at least about 25 weight percent of a solid halogen-containing organic molecule, about 10 to about 30 weight percent of a solid inorganic synergist, and about 20 to about 35 weight percent of a liquid organic phosphate, said dispersion processed prior to addition to the blend to produce particles having a size distribution up to about 20 microns, said halogen-containing organic molecule consisting of at least 50 weight percent of a halogen selected from the group consisting of bromine, chlorine and mixtures thereof, said inorganic synergist including a solid selected from the group consisting of antimony metal, antimony compounds, boron compounds and mixture thereof.

38. The process as defined in claim 37, wherein said homogeneous blend comprises by weight:

Halogen-containing material about 40–about 60%

Inorganic Synergist about 10–about 30%

Organic Phosphorus Carrier about 20–about 35%.

39. The process as defined in claim 37, wherein said halogen-containing material includes decabromo diphenyl oxide.

40. The process as defined in claim 37, wherein said inorganic synergist includes antimony trioxide.

41. The process as defined in claim 37, wherein said organic phosphorus carrier includes an ethoxylated aliphatic phosphate.

42. The process as defined in claim 37, wherein said resin system is selected from the group consisting of polyesters, polyepoxy resins, and polyurethane resins.

43. The process as defined in claim 37, wherein the dispersion is processed through a 3-roll mill to obtain the uniform particle size.

44. The process as defined in claim 37, having a flame-spread value of less than 25 and a smoke rating less than 450 when subjected to ASTM Test No. E-84.

45. The process as defined in claim 37, further including an opacifying pigment.

46. The process as defined in claim 37, wherein the thermosetting resin is polymerized by passing the resin through one or more curing oven.

47. The process as defined in claim 37, wherein the carrier film and top film are removed from the resin following curing.

48. The process as defined in claim 37, wherein said homogeneous blend includes an additive selected from the group consisting of a suspending agent, a viscosity modifier, a smoke suppressant and mixtures thereof.

49. The process as defined in claim 48, wherein said homogeneous blend includes a suspending agent comprising a calcined clay.

50. The process as defined in claim 48, wherein said homogeneous blend includes a viscosity modifier comprising an organic amine salt.

51. The process as defined in claim 48, wherein said homogeneous blend includes a solid smoke suppressant selected from the group consisting of phenolics, melamines, cellulosics and mixtures thereof.

* * * * *